United States Patent
Fodor et al.

(10) Patent No.: US 7,440,429 B2
(45) Date of Patent: Oct. 21, 2008

(54) METHOD AND SYSTEM FOR RE-ESTABLISHING CONTEXT OF DATA PACKET FLOWS

(75) Inventors: Gabor Fodor, Hässelby (SE); Anders Eriksson, Kista (SE); Per Beming, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 292 days.

(21) Appl. No.: 10/584,909

(22) PCT Filed: Dec. 30, 2003

(86) PCT No.: PCT/SE03/02101

§ 371 (c)(1),
(2), (4) Date: Jun. 29, 2006

(87) PCT Pub. No.: WO2005/064893

PCT Pub. Date: Jul. 14, 2005

(65) Prior Publication Data

US 2007/0147282 A1    Jun. 28, 2007

(51) Int. Cl.
*H04Q 7/00* (2006.01)
(52) U.S. Cl. .................. 370/331; 455/436; 455/442
(58) Field of Classification Search ............. 370/331; 455/436, 442
See application file for complete search history.

(56) References Cited

U.S. PATENT DOCUMENTS 7,356,595 B2 *   4/2008   Soininen et al. .............. 709/227

FOREIGN PATENT DOCUMENTS

| WO | 03/052962 | 6/2003 |
| WO | 03/091900 | 11/2003 |

OTHER PUBLICATIONS

Kempf, ed., *Problem Description: Reasons for Performing Context Transfers Between Nodes in an IP Access Network*, Network Working Group, Request for Comments: 3374, Sep. 2002, 13 pages.

* cited by examiner

*Primary Examiner*—Nghi H Ly
(74) *Attorney, Agent, or Firm*—Nixon & Vanderhye P.C.

(57) ABSTRACT

The present invention relates to a system, a Midcom Agent, a method for re-establishing context and a computer program product for performing the steps of said method. In a multi-domain, multi-access IP network there is a need for a method to re-establish context associated with a flow when the end-to-end path changes. The path change is typically due to mobility, but can also be caused by access re-selection (which can be performed for a stationary mobile node as well). Therefore, a method is provided in which the context is moved from one middlebox to at least one selected middlebox via a Midcom Agent. An advantage with the present invention is that it facilitates the transfer of context information from a set of middleboxes to another set of middleboxes. Each set may contain diverse types of such middleboxes.

20 Claims, 3 Drawing Sheets

METHOD AND SYSTEM FOR RE-ESTABLISHING CONTEXT OF DATA PACKET FLOWS

This application is the US national phase of international application PCT/SE2003/002101 filed 30 Dec. 2003, which designated the U.S., the entire content of which is hereby incorporated by reference.

FIELD OF INVENTION

The present invention relates to a system, a Midcom Agent, a method for re-establishing context and a computer program product for performing the steps of said method.

BACKGROUND OF THE INVENTION

The technical field for the present invention is context transfer, especially in networks comprising access points.

Following documentation is regarded as state of the art:
[1] J. Kempf (ed), "Problem Description: Reasons for Performing Context Transfers Between Nodes in an IP Access Network" (RFC 3374); http://www.ietf.org/rfc/rfc3374.txt
[2] J. Loughney (ed), "Context transfer protocol",IETF, Internet draft, October 2003; http://www.ietf.org/html.charters/seamoby-charter.html.
[3] G. Kenward (ed), "General Requirements for context transfer" IETF Internet draft, October 2002; http://www.ietf.org/html.charters/seamoby-charter.html.
[4]R. P. Swale et al., "Middlebox Communications (MIDCOM) Protocol Requirements", IETF RFC 3304; http://www.ietf.org/rfc/rfc3304.txt
[5] B. Carpenter et al, "Middleboxes: Taxonomy and Issues", IETF RFC 3234, 2002; http://www.ietf.org/rfc/rfc3234.txt
[6]P. Srisuresh, "Middlebox Communications (MIDCOM) Architecture and framework", IETF RFC3303; http://www.ietf.org/rfc/rfc3303.txt
[7] R. Hancock (ed): Next Steps in Signalling: Framework", IETF Internet draft, October 2003; http://www.ietf.org/html.charters/nsis-charter.html.
[8] G. Fodor, A. Eriksson, A. Tuoriniemi, "Providing QoS in Always Best Connected Networks", *IEEE Communications Magazine*, Vol 41, No7, pp. 154-163, July 2003.
[9] J. Rosenberg et al., "SIP: Session Initiation Protocol", IETF RFC 3261. http://www.ietf.org/rfc/rfc3261.txt.
[10] M. Handley et al. "SDP: Session Description Protocol", IETF RFC 2327. http://www.ietf.org/rfc/rfc2327.txt.
[11] G. Camarillo (ed), "Integration of Resource Management and Session Initiation Protocol", IETF RFC 3312.http://www.ietf.org/rfc/rfc3312.txt.
[12] K. El Malki (ed), "Low Latency Handoffs in Mobile IPv4", IETF Internet Draft, October 2003.http://www.ietf.org/html.charters/mip4-charter.html.

For context transfer purposes, the organization IETF has developed the Context Transfer protocol (see references [1], [2], [3]). In these documents, the context is defined as the information on the current state of a service required to re-establish the service on a new subnet without having to perform the entire protocol exchange with the mobile host from scratch and Context transfer is defined as the movement of context from router or other network entity to another as a means of re-establishing specific services on a new subnet or collection of subnets.

In IP (Internet Protocol) access networks that support host mobility, the routing paths between the host and the network may change frequently and rapidly. For example, Mobile IP networks allow a mobile node MN or an entire moving network to change acces router AR that provides the first IP layer hop seen from the mobile node or from a moving network's edge. When the MN changes AR (due to, for instance, mobility), there is a need to establish a new path, whose nodes should ideally provide similar treatment to the IP packets as was provided along the old routing path.

In some cases, the host may establish certain context transfer candidate services on subnets that are left behind when the host moves. Examples of such services are Authentication, Authorization and Acounting (AAA), header compression and Quality of Service (QoS). In order for the host to obtain those services on the new subnet, the host must explicitly re-establish the service by performing the necessary signalling flows from scratch. This process may in some cases considerably slow the process of establishing the mobile host on the new subnet.

Alternatively, IP flow related state information, the context, can be transferred to the new subnet. In the example above, context could be transferred from the old AR to the new AR in conjunction with inter-AR hand-over.

The IETF MIDCOM working group (WG) is examining scenarios and defining protocols for IP networks that contain entities that perform functions apart from traditional Layer 3 (L3) routing, so called middle-boxes (MB) (see for example references [4], [5], [6]). A middlebox is defined as any intermediary device performing functions other than the normal, standard functions of an IP router on the datagram path between a source host and a destination host. Such middleboxes may require a context that is specific to the functions and services they perform. For instance, a Quality of Service scheduler may need to maintain some token bucket state associated with an IP flow (QoS context), a firewall may need to know about a security association of an IP flow (security context), etc. For the moment, it is possible to list 22 different kind of middleboxes that could be provided along an end-to-end path.

Middleboxes embed application intelligence within the device to support specific application traversal. Middleboxes supporting the Middlebox Communication (MIDCOM) protocol will be able to externalize application intelligence into Midcom agents. Therefore, Midcom agents are logical entities which may reside physically on nodes external to a middlebox, possessing a combination of application awareness and knowledge of middlebox function. A Midcom agent may communicate and interact with one or more middleboxes. Said Midcom protocol between a Midcom agent and a middlebox allows the Midcom agent to invoke services of the middlebox and allow the middlebox to delegate application specific processing to the Midcom agent. Further, the protocol enables the middlebox to perform its operation with the aid of Midcom agents, without resorting to embedding application intelligence. The transfer of IP flow related state and context information is facilitated by the IETF Context Transfer protocol (see for example ref. [2]). The proposed scope and protocol requirements do not consider scenarios where the context needs to be re-established at an arbitrary point within an IP network that supports middleboxes. For instance in the mobile IP scenario, when the end-to-end path changes during the lifetime of a session, the involved middleboxes may also change upon hand-over. When a particular IP flow is moved from one path to another, new firewalls and packet schedulers may be involved along the new path. In such situations, context needs to be communicated to these new in-path middleboxes rather than just from the "old" access router AR to the "new" access router AR. In fact, the "old" or "new" may not even know which middleboxes along the new path that require to re-establish what type of context (firewall, QoS scheduler, etc) after a mobile IP hand-over.

The particular end-to-end path, along which some middleboxes may need context can traverse multiple operator domains. Herein, a domain or administrative (operator) domain is the collection of hosts, routers, middleboxes and the interconnecting networks managed by a single administrative authority or owner. The devices that operate in the same administrative domain share common security features that are administered across the domain. It is an issue how to distribute the context to the middle-boxes that need the context, since the operator domain where the hand-over occurred may be unaware of the particular middle-boxes that are located in another provider's or operator's domain. Therefore, one problem to be solved is how to make context available even in such situations.

The generalized context transfer problem is stated as follows. In a multi-domain, multi-access IP network there is a need for a method to re-establish context associated with a flow when the end-to-end path changes. The path change is typically due to mobility, but can also be caused by access re-selection (which can be performed for a stationary mobile node as well).

The main requirements on the context re-establishment are:
- It should facilitate seamless hand-over and therefore it should be possible to execute such context re-establishment as fast as possible.
- It should be applicable to paths that contain middle-boxes. These middle-boxes may or may not be split into an Agent and general middle-box-box part as in(see ref. [6]).
- It should be independent of the information elements that define the context. For instance, a QoS context can be described by the so called QoS (wireless) hints, as in reference [8], but these information elements should be transparent to the actual context re-establishment procedure and the employed context transfer protocols.
- It should minimize the necessary involvement of the mobile node. In particular it should allow that the mobile node does not need to re-signal context information upon AR change, thereby facilitating efficient use of spectrum resources in wireless scenarios.
- It should allow scenarios where the context needs to be re-established in several administrative domains.

In simple terms, the problem that the current invention addresses is to define a context transfer procedure that meets the above requirements and the object of the present invention is to provide a solution to the stated problem.

SUMMARY

The problem is solved according to the present invention by a method in which the context is moved from one middlebox to at least one selected middlebox via a Midcom Agent.

The above-mentioned object is achieved by said context method, a system, a Midcom Agent and computer program product set forth in the characterizing part of the independent claims.

Preferred embodiments are set forth in the depending claims.

An advantage with the present invention is that it facilitates the transfer of context information from a set of middleboxes to another set of middleboxes. Each set may contain diverse types of such middleboxes.

A further advantage is that the context transfer procedure is seamless for the old set of middleboxes. That is, adding a new middlebox to the administration domain requires updating the associated Midcom Agent only.

Yet another advantage is that the network solution is not tied to the existing set of middleboxes, but new types of middleboxes can be added to the administrative domain that uses the method of the current invention for performing context transfer.

Yet another advantage is that the Midcom Agents along the end-to-end communications path may belong to several administrative domains.

Yet another advantage with the present invention is that the invented method is independent of the information elements that define the context. That is, in the future contexts may be described by means of new information elements, but the steps of the described procedures remain the same.

Yet another advantage is that the present invention minimizes the involvement of the mobile node. Specifically, it is only required that the mobile node is capable of NSIS signalling to initiate the context, and that the mobile node is ccapable of initiating Context Transfer Start Request CTSR by sending the CTSR message.

BRIEF DESCRIPTION OF THE DRAWINGS

FIG. 2b is a flow chart showing a second part of the method according to the invention. The flow chart starts in FIG. 2a.

DETAILED DESCRIPTION OF PREFERRED EMBODIMENTS

Figure 1:
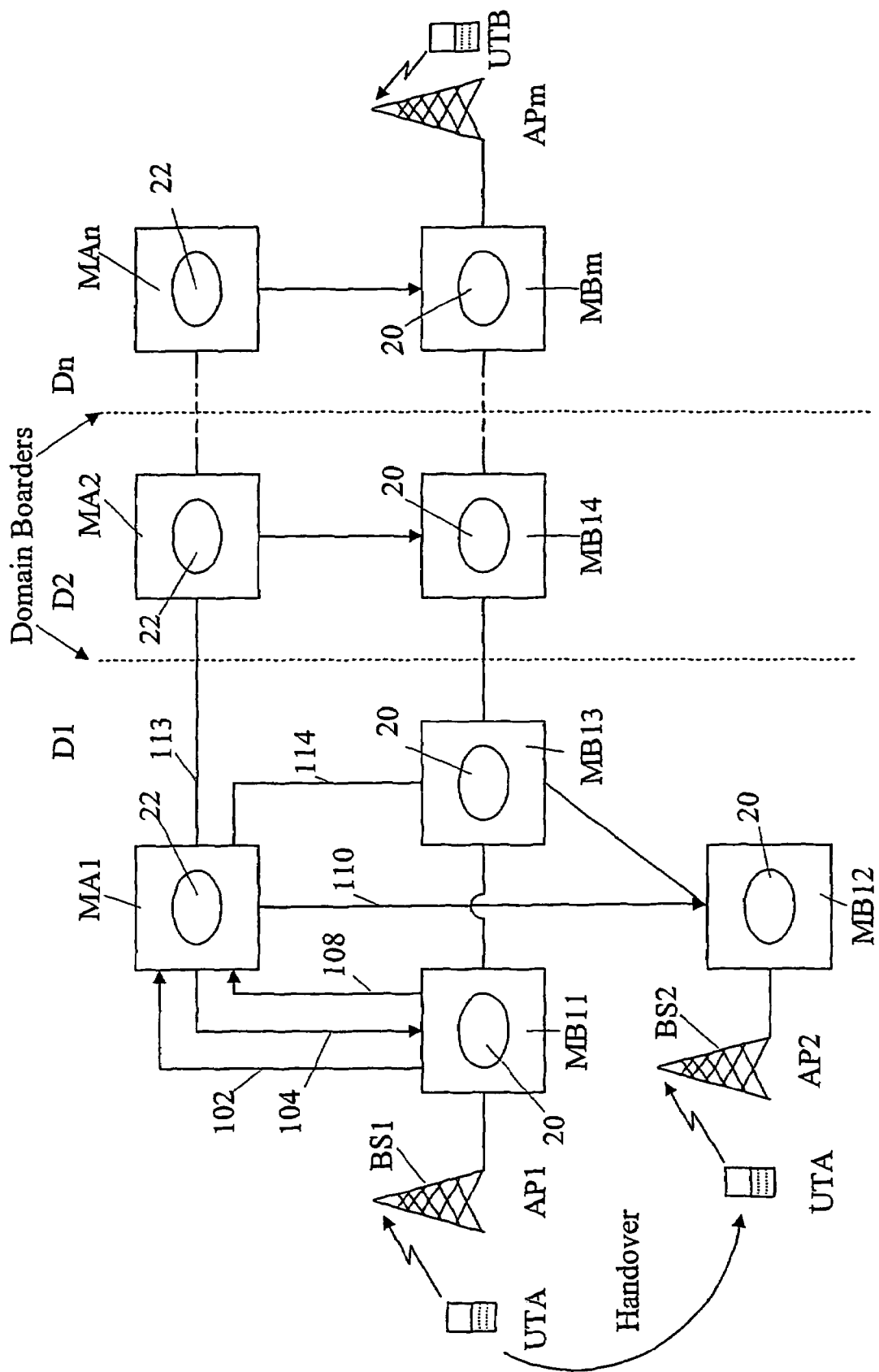
FIG. 1 is a schematic block diagram illustrating a network system according to a preferred embodiment of the invention.

FIG. 1 is a schematic block diagram illustrating an Internet protocol (IP) flow path over a number of domains D1-Dn between two end user terminals UTA, UTB. Said IP information flow is passing a number of middleboxes MB. Each domain comprises one Midcom Agent MA controlling at least one associated middlebox MB. The middleboxes are associated to router nodes that is routing the flow of data packets in accordance with their IP address. The IP flow is generated by one of the user terminals during an end-to-end session. The middleboxes MB store context data for each IP session flow. Once the middleboxes MB within a domain D receive context data, they establish and store the associated context. As user data packets arrive at the middleboxes MB of a domain D, the respective middlebox MB associate these packets with their proper context and provide them with appropriate context dependent service. Such context dependent service is specific to the respective middlebox MB. A middlebox MB has means 20 for controlling the its operation and function. It also comprises means for handling context, e.g. reading, sorting, selecting, deleting, writing, storing, etc. A middlebox has also means for communicating with its associated Midcom Agent by means of one or more suitable protocols. Further, a middlebox comprises means for communicating with other middleboxes by means of one or more suitable protocol. The middleboxes can be implemented by means of computer software program comprising coded instructions, when said computer program software is stored in a computer usable medium and run in a computer or processing means, such as e.g. a server unit, a microprocessor, PC, data processing unit, CPU, etc.

As mentioned above, the network comprises a horizontal IP layer state-ful protocol, for example NSIS, that is implemented by the user terminal as well as all involved middleboxes MB. (Said protocol is described further down in this description.) A vertical protocol, for example the Midcom protocol, allows Midcom Agents to distribute and/or redistribute context information among middleboxes that are under control of said Midcom Agent. Said protocols contains information elements that allows the description of contexts.

When a user terminal UT starts a session, it starts signalling along the end-to-end path UTA-UTB in order for the context, e.g. session related context, to get established in the middleboxes MB along the path UTA-UTB. That is, in all middleboxes MB, that the user session data is going to traverse, the proper QoS, security or other context needs to be established and configured. The user terminals UT use a session layer, e.g. SIP/SDP, and/or an IP level signalling protocol, that supports the establishment and manipulation of arbitrary state information along the path of the IP flow. Such IP level stateful multi-domain protocol that is being standardized by the IETF is the group of of protocols termed Next Steps in Signalling (NSIS). The NSIS protocol family is therefore the preferred IP level signalling protocol of the present invention. The connection between the Midcom Agents is referred to as the control plane.

NSIS carries all information elements that are necessary to establish proper context in each domain D. The respective Midcom Agents MA that receive this signalling, examine the information elements and use the Midcom protocol to distribute. context information to the middleboxes MB that are under their control. Hence, the interface between separate Midcom Agents MA is a state-full, horizontal, and domain independent protocol. The NSIS protocol fulfil these requirements. The Interface between the Midcom Agent MA and its associated middleboxes MB is the Midcom protocol.

A Midcom Agent MA has means 22 for controlling the its operation and function. It also comprises means for handling context, e.g. reading, sorting, selecting, deleting, writing, storing, etc. Midcom Agent MA has also means for communicating with its associated middleboxes MBs by means of one or more suitable protocols. Further, a Midcom Agent MA comprises means for communicating with other Midcom Agents MAs by means of one or more suitable protocol. The Midcom Agent MA can be implemented by means of computer software program comprising coded instructions, when said computer program software is stored in a computer usable medium and run in a computer or processing means, such as e.g. a server unit, a microprocessor, PC, data processing unit, CPU, etc.

Domain D1 comprises two access points AP 1, AP 2 for mobile communication with mobile user terminals. Each access point AP1, AP2 comprises an access router AR (not shown), which is connected over an interface to a base station BS in a mobile radio access network. User movement may cause a handover to a new base station and a new access router.

The change of access router AR results in a new IP flow path, and middleboxes MB along the new path has to be up-graded regarding the proper, i.e. the valid, context data. In FIG. 1, user terminal UTA is communicating with user terminal UTB via a flow path starting in UTA that is communicating via a radio interface with the base station BS in access point AP1 comprising an access router AR (not shown) and middlebox MB11. The flow of data packets will flow through the network, starting in middlebox MB11, passing a number of domains and middleboxes, which have the proper context for controlling and supporting the IP flow of data packets, and finally arrive at middlebox MBm, which is associated to an access router AR in the access point APm. Access point APm is capable of communicating with the user terminal UTB. The flow path in the network can be described as starting in middlebox MB11, passing through MB13 to MBm.

A situation is illustrated in FIG. 1, wherein the User Terminal UTA is moving towards the access point AP2. If the terminal UPA is measuring the received signal strength from the surrounding base stations BS, the User Terminal UTA may find it necessary to perform an handover to the base station BS2 in AP2, as the signal strength from BS1 (associated with AP1) becomes weaker than from BS2. The movement is therefore causing a L2 trigger in the terminal resulting in a handover to BS2 and AP2. The new flow path in the network can be described as starting in middlebox MB12 (instead of MB11), passing through MB13 to MBm. A fast context transfer from MB11 to MB12 is therefore necessary. Hence, a User Terminal UT has to be capable of initiating a context transfer procedure, by sending a Context Transfer Start Request (CTSR), which will be further described. The invented mechanism for context transfer will now be described with help of FIG. 1 and FIG. 2.

Figure 2A:
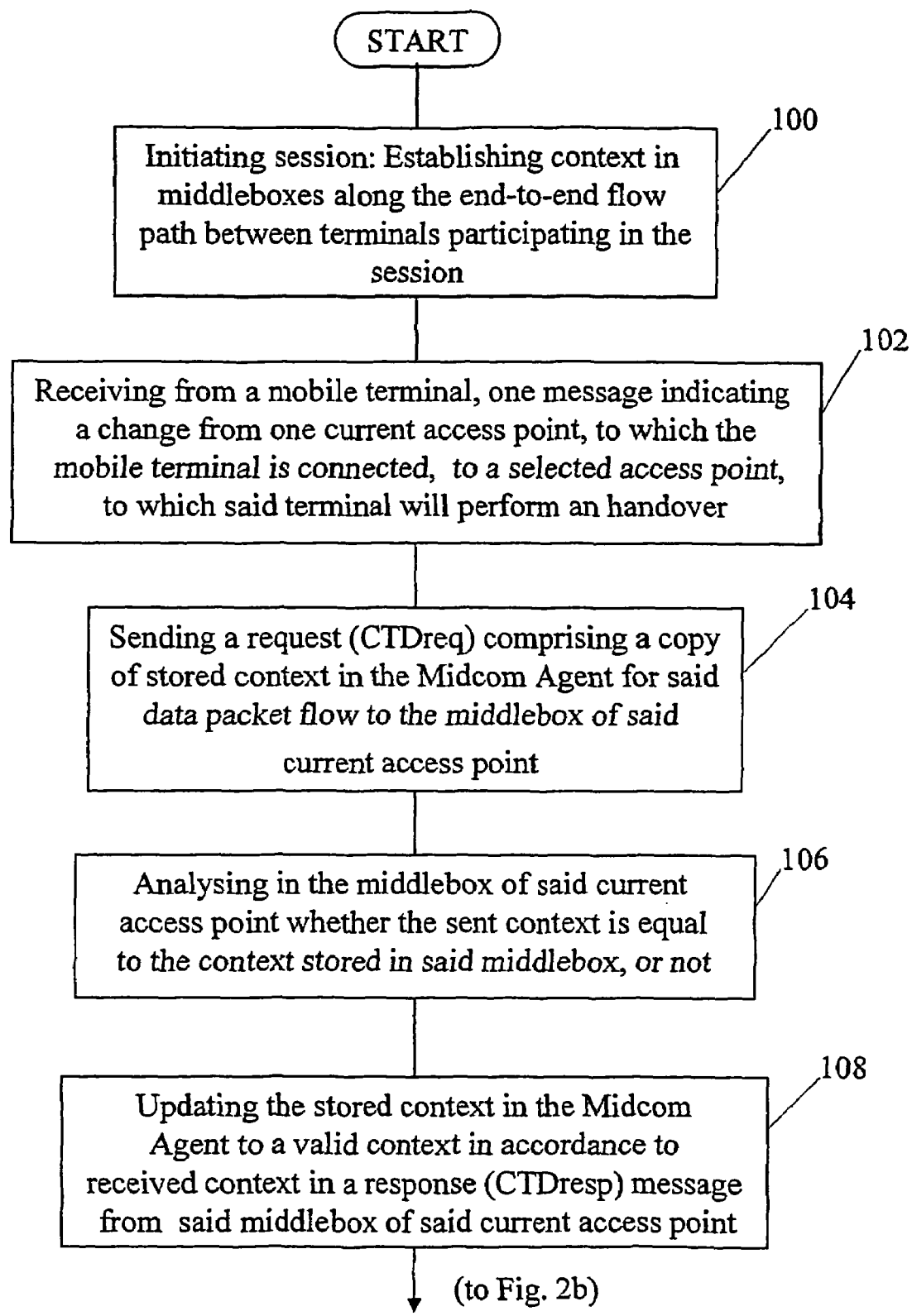
FIG. 2a is a flow chart showing a first part of the method according to the invention. The flow chart continues in FIG. 2b.
Figure 2B:
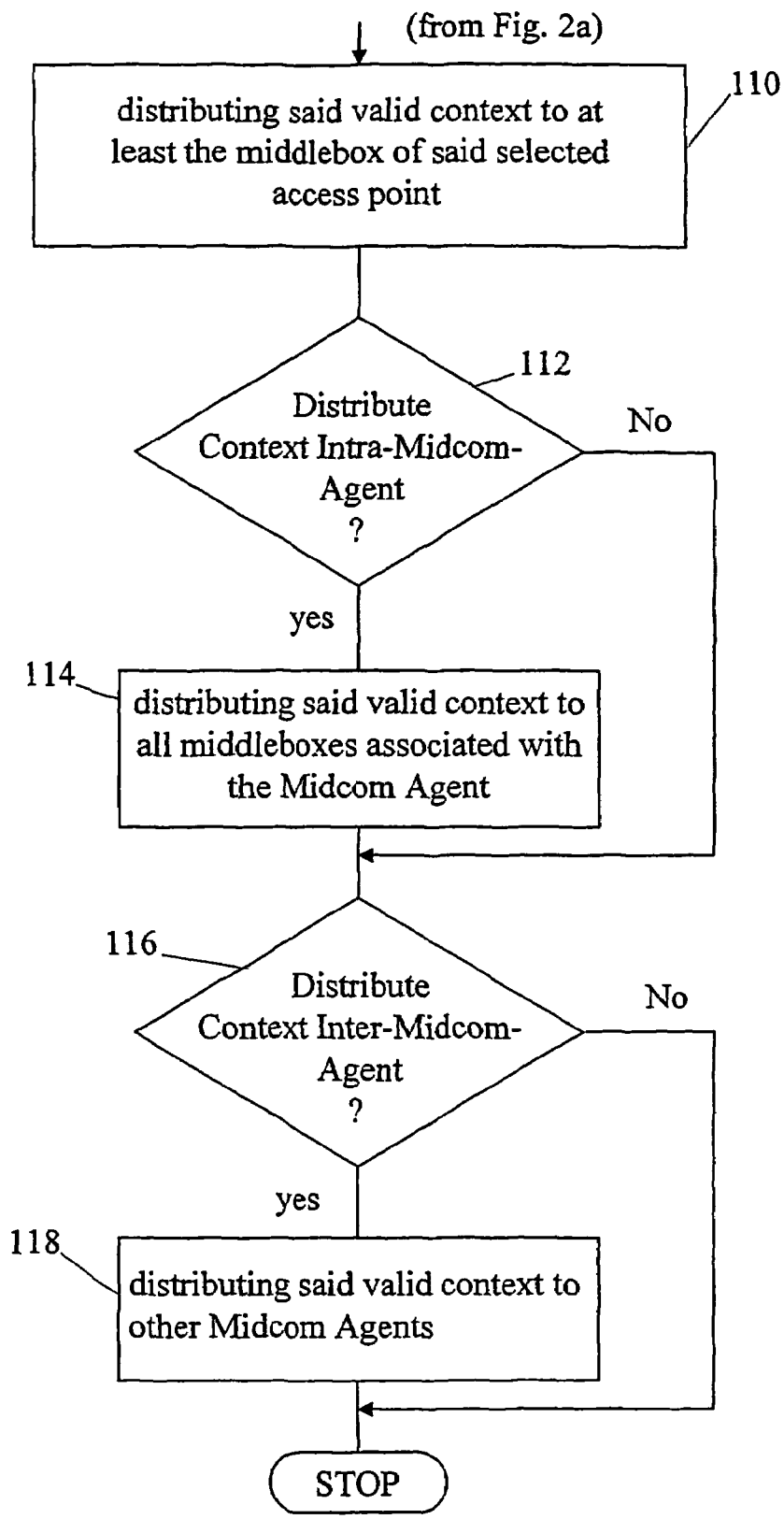

FIG. 2 is a flow chart illustrating a method for re-establishing context of an IP information flow by means of a Midcom Agent MA1 according to the present invention.

Before a context transfer according to the present invention is possible to perform, the context for the data packet flow of a session has to be established in the middleboxes along the end-to-end-path between terminals participating in the session. Therefore, it is assumed that the context has been established in the middleboxes along the end-to-end-path between the terminals UTA, UTB (step 100).(The negotiation of context is not within the scope of this invention.)

In step 102, the Midcom Agent MA1 receives from the User Terminal (Mobile node) UTA, one CTSR (Context Transfer Start Request) message indicating a change from one current access point AP1 (to which UTA is currently connected to) to a selected access point AP2 within the domain D1 of said Midcom Agent MA1.

Step 102, is initiated when the user terminal UTA decides on executing an access router AR change, said terminal sends the Context Transfer Start Request (CTSR) message using NSIS protocol towards its communicating party through its currently serving ingress domain D1 Midcom Agent MA1. Said CTSR message contains information about the current and the desired, or selected, next access point AP2 and middlebox MB12. This step assumes that the user terminal UTA receives sufficient information to perform some form of access selection and decision algorithm including the decision on the new access point AP (AP2) and middlebox (MB12). This can be achieved by using e.g. Layer 2 (L2) triggers, or L3 candidate router advertisements earlier known from reference [12]. However, the details of this procedure are out of the scope of the invention. This procedure yields that the terminal initiates the context transfer by sending the CTSR message using IP layer signalling (specifically NSIS, see ref. [7]) towards its communicating party through the ingress Midcom Agent MA1. The CTSR message includes the IP address of the selected access point AP (AP2 in FIG. 1) and access router AR.

After having received the CTSR message, the Midcom Agent MA1 sends a CTDReq (Context Transfer Data Request) message to the current middlebox MB11, step 104. The request (CTDreq) message comprises a copy of stored context in the Midcom Agent for said data packet flow to the middlebox MB11 of said current access point.

In next step, step 106, the current middlebox MB11 analyses if the sent context is equal to the context stored in said middlebox MB11. The context is associated with the user terminal UTA and determines whether that context has been updated since context data was received from the Midcom Agent MA1 and the context was established based on said data. If it has, the current context is included in the CTDResp (Context Transfer Data Response) message, otherwise the CTDResp message only serves as an acknowledgment of the CTDReq message.

In step 108, the Midcom Agent MA11 updates according to new received context in a CTDresp message from the middlebox MB11 of said current access point AP1 said stored context to a valid context.

In step 110, the Midcom Agent MA1 distributes said valid context CTD to at least the middlebox MB12 of said selected access point AP2, but even to other middleboxes along the new flow path within the Midcom Agent's domain. The Midcom Agent MA11 can further send context (modified or the same) to other middleboxes MB within its domain D1, a so called intra-agent generalized context transfer for re-establishing context. The Midcom Agent MA1 sends this context, or a modified context (modified by the MA to fit the new access router AR and associated middlebox) to the next middlebox MB12. The Midcom Agent MA1 uses the IP address of the next middlebox MB 12. Here the Midcom Agent MA1 makes use of the information that it received in the CTSR message for identifying the new middlebox MB12 and access router AR (in AP2) that the mobile user terminal UTA is connected to after the hand-over procedure. The Midcom Agent MA1 uses the MIDCOM protocol (see for example ref. [4]) to send the context to the next middlebox MB12 and to other middleboxes along the new flow path within the Midcom Agent's domain.

As stated above, the Midcom Agent MA1 may modify the context that it sends to the middlebox MB12 of the next access point AP2 and its associated access router. This modification is based on information on the actual context usage in the new access router, stored in the Midcom Agent MA1. For instance, if the old access router does not support differentiated packet scheduling functionality, that part of the context (e.g. current state of a token bucket associated with the IP flow) does not need to be sent to the new middlebox MB12.

The Midcom Agent MA1 can further send context (modified or the same) to other middleboxes MB within its domain D1 that need it if the set of middleboxes "used" by the terminal has changed (or if they need to be updated due to the new AR). If the context has been updated, the Midcom Agent needs to distribute to all middleboxes within its domain D (with which it has a Midcom protocol level association). The Midcom Agent has to decide, step 112, whether such context distribution has to take place or not. If the criteria for distributing context to other middleboxes than those already updated with valid context is fulfilled, "yes", a distribution will be performed according to step 114. Step 114 will not be executed if no other middleboxes have to be updated with valid context.

The Midcom Agent may decide to execute inter-agent generalized context transfers, step 116. When the MIDCOM Agent for the first time receives context for a new data packet flow from one of its middleboxes, or a CTSR message, or has modified the context, the Midcom Agent makes a decision to send the context to other MIDCOM agents that lie in different domains. The Midcom Agent sends the context downstream to its next-hop Midcom Agent, step 118. However, if the operator of the domain D to which the MIDCOM Agent belongs has decided a policy to prohibit the Midcom Agent to send context associated with certain sessions, such session context will be stopped.

The invention also relates to a system comprising means for performing the method according to claim 1-6.

Further, the invention relates to a Midcom Agent for re-establishing context according to the method claims 1-6.

The method may be implemented by means of a computer program product comprising the software code means for performing the steps of the method. The computer program product is run on processing means, such as e.g. a server unit, a microprocessor, PC, data processing unit, CPU, etc., within a network, or in a separate processing means connected to a network. The computer program is loaded from a computer usable medium.

The present invention is not limited to the above-described preferred embodiments. Various alternatives, modifications and equivalents may be used. For example, the embodiments of the invention have been implemented by means of Internet Protocol technology (IP). However, the invention are also applicable with ATM (Asynchronous Transfer Mode) technology and MPLS (Multi Protocol Label Switching).

Therefore, the above embodiments should not be taken as limiting the scope of the invention, which is defined by the appending claims.

The invention claimed is:

1. A method for re-establishing context of data packet flow between terminals through at least a network comprising a number of routers for routing data packet flows between the routers along data packet flow paths connecting said terminals, of which terminals at least one is mobile and may change access between different access points of said at least a network, wherein an access point comprises an access router and a middlebox, which is controlled and supported by an associated Midcom Agent, characterized by the steps of:
   receiving from a mobile terminal, one message indicating a change from one current access point, to which the mobile terminal is connected, to a selected access point, to which said terminal will perform an handover;
   sending a request comprising a copy of stored context in the Midcom Agent for said data packet flow to the middlebox of said current access point;
   analysing in the middlebox of said current access point whether the sent context is equal to the context stored in said middlebox, or not;
   updating the stored context in the Midcom Agent to a valid context in accordance to received context in a response (Context Transfer Data response) message from said middlebox of said current access point;
   distributing said valid context to at least the middlebox of said selected access point.

2. A method according to claim 1, characterized in that the message, which is indicating a change from one current access point to a selected access point, is a CTSR (Context Transfer Start Request) message involving the IP address of the selected access point.

3. A method according to claim 1, characterized in that the response (Context Transfer Data response) message will only contain a confirmation if the sent context is equal to the context stored in said middlebox.

4. A method according to claim 1, characterized in that context is established during the an initiation session in middleboxes along the end-to-end flow path between terminals participating in the session.

5. A method according to claim 1, characterized in that said valid context is distributed to all middleboxes associated with the Midcom Agent (MA).

6. A method according to claim 1, characterized in that said valid context is distributed to other Midcom Agents (MA).

7. A computer program product comprising computer executable software stored on a computer readable medium, the software being adapted to run at a computer or other processing means characterized in that when said computer executable software is loaded and read by said computer or other processing means, said computer or other processing means is able to perform the steps of the method according to claim 1.

8. A computer program product stored on a computer usable medium, comprising readable program for causing a processing means within a network node to control the execution of the steps of claim 1.

9. A Midcom Agent or re-establishing context of data packet flow between terminals through at least a network comprising a number of routers for routing data packet flows between the routers along data packet flow paths connecting said terminals, of which terminals at least one is mobile and may change access between different access points of said at least a network, wherein an access point comprises an access router and a middlebox, which is controlled and supported by an associated Midcom Agent, characterized in that it comprises:

Means for receiving from one of the User Terminals, one CTSR message indicating a coming path change from one current access point to a selected access point;

Means for sending a CTDreq comprising a copy of stored context for said IP information flow path to the middlebox of said current access point;

Means for updating according to new received context in a CTDresp message from the middlebox of said current access point said stored context to a valid context;

Means for distributing said valid context to at least the middlebox of said selected access point.

10. A Midcom Agent according to claim 9, characterized in that the message, which is indicating a change from one current access point to a selected access point, is a CTSR (Context Transfer Start Request) message involving the IP address of the selected access point.

11. A Midcom Agent according to claim 9, characterized in that the response (Context Transfer Data response) message will only contain a confirmation if the sent context is equal to the context stored in said middlebox.

12. A Midcom Agent according to claim 9, characterized in that the agent comprises means for establishing context during the an initiation session in middleboxes along the end-to-end flow path between terminals participating in the session.

13. A Midcom Agent according to claim 9, characterized in that it comprises means for distributing context to all middleboxes associated with the Midcom Agent (MA).

14. A Midcom Agent according to claim 9, characterized in that it comprises means for distributing context to other Midcom Agents (MA).

15. A system for re-establishing context of data packet flow between terminals through at least a network comprising a number of routers for routing data packet flows between the routers along data packet flow paths connecting said terminals, of which terminals at least one is mobile and may change access between different access points of said at least a network, wherein an access point comprises an access router and a middlebox, which is controlled and supported by an associated Midcom Agent, characterized in that it comprises:

Means for receiving from one of the User Terminals, one CTSR message indicating a coming path change from one current access point to a selected access point;

Means for sending a CTDreq comprising a copy of stored context for said IP information flow path to the middlebox of said current access point;

Means for analysing in the middlebox of said current access point whether the sent context is equal to the context stored in said middlebox, or not Means for updating according to new received context in a CTDresp message from the middlebox of said current access point said stored context to a valid context;

Means for distributing said valid context to at least the middlebox of said selected access point.

16. A system according to claim 15, characterized in that the message, which is indicating a change from one current access point to a selected access point, is a CTSR (Context Transfer Start Request) message involving the IP address of the selected access point.

17. A system according to claim 15, characterized in that the response (Context Transfer Data response) message will only contain a confirmation if the sent context is equal to the context stored in said middlebox.

18. A system according to claim 15, characterized in that the agent comprises means for establishing context during the an initiation session in middleboxes along the end-to-end flow path between terminals participating in the session.

19. A system according to claim 15, characterized in that it comprises means for distributing context to all middleboxes associated with the Midcom Agent (MA).

20. A system according to claim 15, characterized in that it comprises means for distributing context to other Midcom Agents (MA).

* * * * *

UNITED STATES PATENT AND TRADEMARK OFFICE
CERTIFICATE OF CORRECTION

| | |
|---|---|
| PATENT NO. | : 7,440,429 B2 |
| APPLICATION NO. | : 10/584909 |
| DATED | : October 21, 2008 |
| INVENTOR(S) | : Fodor et al. |

It is certified that error appears in the above-identified patent and that said Letters Patent is hereby corrected as shown below:

Column 7, Line 8, delete "MA11" and insert -- MA1 --, therefor.

Column 7, Line 16, delete "MA11" and insert -- MA1 --, therefor.

Signed and Sealed this

Twenty-first Day of April, 2009

JOHN DOLL
*Acting Director of the United States Patent and Trademark Office*